(12) United States Patent
Sergison et al.

(10) Patent No.: US 11,192,647 B2
(45) Date of Patent: Dec. 7, 2021

(54) VISUAL AND AUDIBLE SIGNATURE REDUCTION OF AN UNMANNED AERIAL VEHICLE (UAV) TO MINIMIZE DETECTION DURING LONG DURATION SURVEILLANCE OPERATIONS

(71) Applicant: BAE Systems plc, London (GB)

(72) Inventors: Darryl James Sergison, Alton (GB); Paul Brooks, Alton (GB); Jonathan David Dixon, Alton (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 17/284,685

(22) PCT Filed: Oct. 8, 2019

(86) PCT No.: PCT/GB2019/052836
§ 371 (c)(1),
(2) Date: Apr. 12, 2021

(87) PCT Pub. No.: WO2020/079398
PCT Pub. Date: Apr. 23, 2020

(65) Prior Publication Data
US 2021/0309362 A1 Oct. 7, 2021

(30) Foreign Application Priority Data
Oct. 15, 2018 (GB) .................................... 1816734

(51) Int. Cl.
*B64C 39/02* (2006.01)
*B64D 47/02* (2006.01)
(Continued)

(52) U.S. Cl.
CPC .............. *B64C 39/024* (2013.01); *B64C 1/12* (2013.01); *B64D 47/02* (2013.01); *G05D 1/0094* (2013.01);
(Continued)

(58) Field of Classification Search
CPC .................... B64C 39/024; B64C 1/12; B64C 2201/127; B64C 2201/22; B64C 2201/021; G05D 1/0094; B64D 47/02; B64D 47/06
See application file for complete search history.

(56) References Cited

U.S. PATENT DOCUMENTS

| 10,095,242 | B1 | 10/2018 | Von Novak | |
| 2003/0102406 | A1* | 6/2003 | Chow | B64C 25/16 |
| | | | | 244/1 OOR |

(Continued)

FOREIGN PATENT DOCUMENTS

| GR | 20130100619 A | 5/2015 |
| KR | 20110045856 A | 5/2011 |
| WO | 2010002379 A1 | 1/2010 |

OTHER PUBLICATIONS

International Search Report and Written Opinion of PCT Appl. No. PCT/GB2019/052836, dated Jul. 1, 2020, 15 Pages.
(Continued)

*Primary Examiner* — Assres H Woldemaryam
(74) *Attorney, Agent, or Firm* — Maine Cernota & Rardin

(57) ABSTRACT

The invention comprises of a UAV designed to limit visually contrast and audibility in flight for covert surveillance operations, a method of configuring the UAVs structure to further reduce its visual signature to take account for the atmospheric and terrestrial environment it will operate in and a method of conducting a covert surveillance operation to actively minimise the UAVs visual & auditory signature from the viewpoint of an individual under surveillance. Both passive and active illumination are used to reduce the visual signature of the UAV. The UAV is actively camouflaged using lighting techniques that utilises the limitations of the human visual system and the optical effects of light interacting with the terrain, atmosphere and aircraft. The visual camouflage is directional. The audible signature of the UAV
(Continued)

is reduced through the design of the propulsion system and the mode in which the UAV is operated.

19 Claims, 5 Drawing Sheets

(51) Int. Cl.
*B64C 1/12* (2006.01)
*G05D 1/00* (2006.01)

(52) U.S. Cl.
CPC .. *B64C 2201/021* (2013.01); *B64C 2201/127* (2013.01); *B64C 2201/22* (2013.01)

(56) References Cited

U.S. PATENT DOCUMENTS

| | | | |
|---|---|---|---|
| 2004/0108411 A1* | 6/2004 | August | F42B 15/00 244/2 |
| 2004/0251377 A1 | 12/2004 | Dammar | |
| 2007/0190368 A1* | 8/2007 | Jung | F41H 3/00 |
| 2009/0152391 A1* | 6/2009 | McWhirk | B64B 1/02 244/30 |
| 2014/0301095 A1* | 10/2014 | Lengers | B29D 11/00673 362/470 |
| 2018/0074519 A1* | 3/2018 | Qin | H04N 5/2252 |
| 2018/0222570 A1 | 8/2018 | Fisher | |

OTHER PUBLICATIONS

International Preliminary Report on Patentability for PCT Appl. No. PCT/GB2019/052836, dated Apr. 29, 2021, 10 Pages.

\* cited by examiner

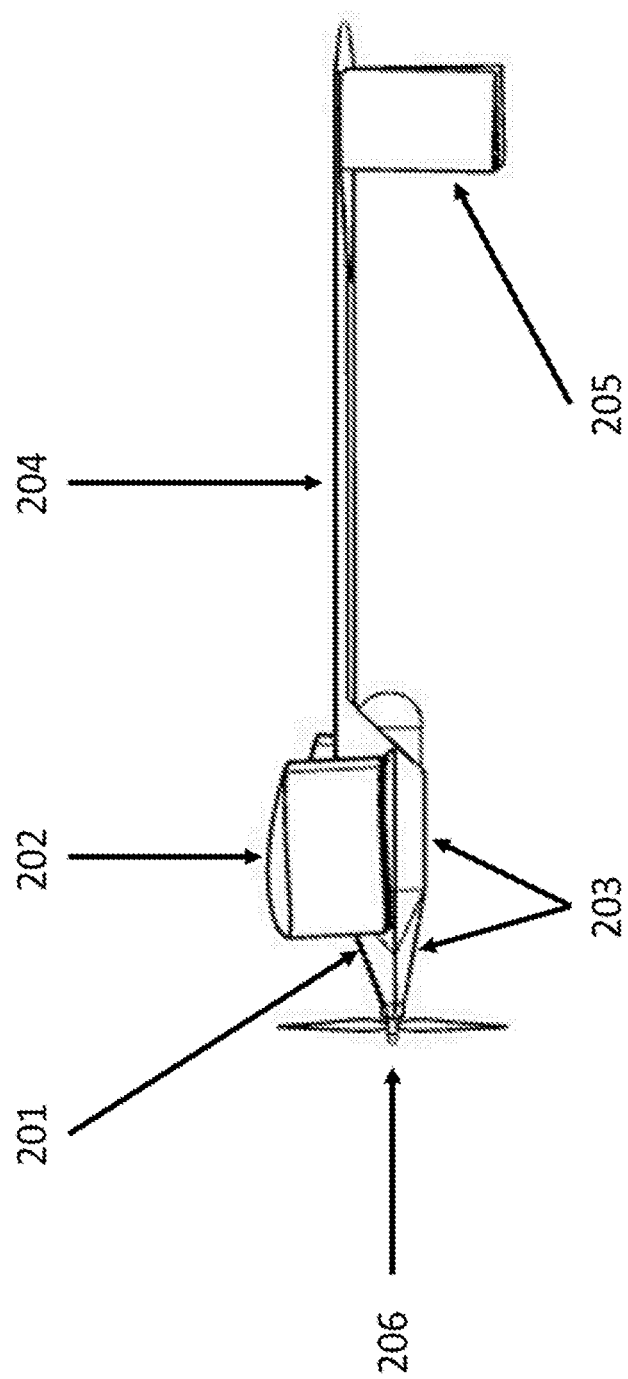

VISUAL AND AUDIBLE SIGNATURE REDUCTION OF AN UNMANNED AERIAL VEHICLE (UAV) TO MINIMIZE DETECTION DURING LONG DURATION SURVEILLANCE OPERATIONS

RELATED APPLICATIONS

This application is a national phase application filed under 35 USC § 371 of PCT Application No. PCT/GB2019/052836 with an International filing date of Oct. 8, 2019, which claims priority of GB Patent Application 1816734.6 filed on Oct. 15, 2018. Each of these applications is herein incorporated by reference in its entirety for all purposes.

FIELD

The present invention relates to an unmanned aircraft (UAV) adapted to minimise visual and audible detection during flight and a method of operating such a UAV.

BACKGROUND

UAVs are increasingly being used for covert surveillance operations. To successfully fulfil this role, the ability of the UAV to remain undetected by an individual under surveillance is critical.

Research into human sensory perception indicates that sound, motion and contrast against the background act as triggers to change the focus of attention towards an object. Minimising these sensory clues would therefore increase an object's ability to remain undetected. For a small UAV undertaking covert surveillance operations this means reducing the aircraft's audible and visual signatures in an efficient way that does not increase its weight or power requirements.

Visual and thermal camouflage techniques for aircraft are well known but commonly involve equipment that is heavy, power intensive and requires complex real-time control systems to operate effectively. Such systems are not practical for small, light-weight, low power UAVs operating at low altitudes (300 m-3000 m) for periods more than 12 hours.

Attempting to reduce the audible signature of an aircraft centres on the propulsion system and the way in which the aircraft is flown. The aim is to reduce the sound made by the aircraft to a constant, low volume noise that becomes part of the general background noise.

SUMMARY

The visual signature of an aircraft is dependent on its physical attributes but also on the limitations of the human eye. Physically an aircraft can be colour camouflaged, shaped to reduce its visual profile, and constructed of materials that render it difficult to detect.

For individuals with 20:20 vision, the ability to resolve an object depends on its size, distance, viewing angle, the degree of contrast with the background and the colour of the object. At an altitude of 1000 m, an observer of a small object cannot distinguish details clearly due to the limitation of the eye. In particular, changes of colouration are less of a factor in influencing a change of focus of attention than changes in brightness that increase the contrast against the background. To avoid an obvious contrast between an object and its background the brightness of both needs to be a close match. The contrast between an aircraft and the sky is caused by the amount of light blocked and reflected by the aircraft.

During daylight hours an aircraft in flight will be illuminated directly by the Sun and indirectly by the scattering of light by atmospheric particles and clouds also known as sky light or sky radiance. From the point of view of an observer on the ground this light is blocked out by the aircraft's structure. This results in a high degree of contrast between the aircraft and the sky behind it making it more noticeable. The aircraft appears darker than the sky.

The amount of solar radiation blocked depends, in part, on the altitude of the aircraft. The higher the altitude the less light is blocked. Another factor that affects the brightness of an object in the sky and therefore the degree of contrast is the amount of reflected light it receives from the ground and how that light is reflected or absorbed by the aircraft's surface. Ground reflection is light that is diffusely reflected by the Earth's surface that comes from direct solar illumination and indirect sky radiance. It is, in turn, reflected from the underside of the aircraft increasing the brightness and therefore the contrast between the aircraft and sky. The degree of reflectivity depends on the type of material used to coat the aircraft's exterior structure.

The present invention comprises a UAV designed to limit visual contrast and audibility in flight, a method of configuring the UAV's exterior structure to further reduce its visual signature to take account of the atmospheric and terrestrial environment it will operate in and a method of conducting a covert surveillance operation to actively minimise the UAV's visual and auditory signature from the viewpoint of an individual under surveillance. The invention does this with minimal increase in mass and power consumption allowing the UAV to operate for a long duration. It should be noted that the invention does not attempt to reduce the thermal or radar signatures of the UAV.

To reduce the likelihood of auditory detection by an individual under surveillance the UAV is equipped with efficient electric motors which are selected so that they produce low levels of noise at full power. During flight the speed is kept low and constant by flying straight and avoiding sudden changes in direction which would increase engine noise and tone. In operation, the UAV's engine noise becomes part of the general background noise. By using quiet motors and flying smoothly the noise from the UAV is minimised thereby reducing the audible signature of an aircraft.

To reduce the visual signature both passive and active illumination are used together. The invention also utilises the limitations of the human visual system and the optical effects of light interacting with the terrain, atmosphere and aircraft to render the UAV indistinct. Since the UAV is intended for use in covert surveillance of a specific individual, the UAV does not need to be rendered indistinct from all possible angles, merely from the viewpoint of the individual under surveillance. Visual camouflage can therefore be directionally targeted.

Passive illumination is partly achieved through the structural design, colouration and reflective characteristics of the UAV and how it interacts with reflected light. Firstly, the UAV is designed to be small and to have a small surface area.

Secondly, the shape of the body, tail boom and tail are all designed so that there are no right angles or curved surfaces. The flattened, angular shape of the body and the orientation of the surfaces reduce specular reflection in flight. Although this technique is well known for RADAR signature in most stealth aircraft it assumes that the illuminator and detector are co-located. This is not the case with the present invention where the illuminator (i.e. the Sun), is not located near the target under surveillance on the ground.

The current invention biases the shape to reduce specular reflection from the sun to a specific viewpoint for the UAV's normal mode of operation. The design is based on the assumption that the surfaces will be viewed from the side at a nominal angle of between 20° and 45° from the viewpoint of an individual at a range of 1000 m-3000 m and an altitude of 1000 m. These parameters reflect the expected range and elevation that the UAV operates at for the majority of the time during a covert operation.

The small size of the UAV renders it more difficult to detect at altitude and the shape reduces the likelihood of glint in sunlight.

It is a fundamental requirement of the invention that the passive visual signature of the UAV should never be brighter than its background. By being brighter, it would exhibit a higher degree of contrast making it more noticeable. From a design perspective it is easier to light up a dark object than darken a light one. The upper surfaces of the fuselage, tail and wings have a dark colouration with diffuse reflective qualities e.g. a matt dark grey. The lower surfaces have a lighter colouration that is chosen so that it is darker than a bright cloudy sky e.g. a reflective light grey or white. The propeller also has a light colouration but with diffuse reflective qualities e.g. a matt light grey. This ensures that at altitude the aircraft blends into the background for a range of sky colour types from clear blue to dark grey overcast but always remains darker than the background.

Together, these features reduce the specular reflection or glint of the airframe and provide a neutral colour against the background for a range of sky conditions. The design ensures that at altitude the aircraft becomes indistinct to the human eye. These design features are the first stage in reducing the visual signature of the aircraft by providing a degree of visual camouflage through passive illumination.

Prior to a covert surveillance operation, the UAV undergoes a second configuration in which the passive illumination design described above is further biased in favour of the terrestrial and atmospheric conditions expected during a specific operation. This involves an assessment of the level of active illumination required for the operation.

The configuration is primarily concerned with the selection of light sources and wing assemblies to meets these requirements.

The method for calculating the amount of active illumination required to camouflage the aircraft is as follows. The first step is to calculate the ground reflectance that is reflected by the aircraft. Ground reflection is the amount of light reflected by the Earth's surface towards the aircraft. This represents the amount of direct solar illumination at the ground which is dependent on the amount of solar illumination entering the atmosphere and the angle of the sun to the ground at the latitude the aircraft is to operate at [FIG. 1 reference a]. This value is added to the amount of illumination received at the ground from sky radiance. Sky radiance is indirect solar radiation that has been reflected by atmospheric particles [FIG. 1 reference b] and cloud cover [FIG. 1 reference c] (if any). The resulting value represents the amount of solar power received at the ground. The sky radiance is expected for the atmospheric conditions adjusted for the operational altitude, and is essentially the light obscured by the aircraft.

Only a small percentage of the solar radiation received at ground level is reflected back towards the aircraft [FIG. 1 reference d] and this is dependent on the terrain type that the aircraft will operate over. Light coloured terrain (e.g. water, snow, sand) reflects more light than dark coloured terrain (e.g. vegetation, forest). The ground reflectance is itself reflected by the aircraft [FIG. 1 reference f]. The amount is dependent on the reflectiveness of the underside of the fuselage and wings. The materials, coatings and colouration contribute to the reflective quality of the aircraft and are part of the passive illumination described above. A nominal starting value of 60% is used for the aircraft's reflectiveness. Reflection occurs only from the lower surfaces so the amount of reflectivity is divided by pi ($\pi$) to give the amount of light reflected by the aircraft towards the Earth.

The ground reflectance is direct solar radiation incident on the ground at the sun's angle for the latitude plus the indirect sky radiance and the reflectiveness of the terrain.

The second step is to calculation of the amount of light blocked out by the aircraft.

This comprises of sky radiance and radiance reflected by any cloud cover [FIG. 1 reference e] but is also dependant on the transparency of the aircraft's structure. To calculate the amount of light blocked the aircraft is assumed to be at a nominal altitude of 1000 meters and is not transparent.

The amount of light the aircraft must actively emit to match its background is derived in the third step. The blocked radiance from step two must be adjusted to take account of the portion of the ground radiance that is reflected by the aircraft found in step one. The net obscured light value is the amount of light that must be emitted by the aircraft.

The final step in the method is to adjust the value from step three to take account the viewpoint of the individual under surveillance [FIG. 1 reference g]. This is the product of:

the surface area of the underside of the aircraft, the angle that the individual would view the aircraft if they are looking directly at it, nominally an angle of between 20° and 45° to the aircraft is used, the solid angle that the aircraft emits light in the direction of the individual [FIG. 1 reference h], where the solid angle subtended by the aircraft is less than that a person with 20:20 vision can resolve at the distance and angle of the aircraft as viewed by the individual [FIG. 1 reference i] a compensating value is added. This value is the solid angle subtended by the aircraft divided by the solid angle resolvable by the human eye. This is the amount of light required to match the background sky in the direction of the individual on the ground.

A light source capable of producing the required level of luminescence is attached to the internal surface of the wings. The light source consists of (in other words, comprises) one or more light emitters such as light emitting diodes (LED). Multiple sets of wings can be preconfigured with different types of light emitter capable of emitting different levels of illumination and having different levels of reflectivity.

The wings may also have transparent upper and lower surfaces that allow most of the sky radiance normally obscured by the wings to be seen. Such a wing might be used if the aircraft is expected to operate in dark overcast conditions and reduces the amount of active illumination required which in turn increases the power available to maintain flight altitude for a longer duration.

A surveillance camera is attached to the lower surface of the fuselage and light sensor to the upper surface of the fuselage. The sensor and camera are aligned with each other but point in opposite directions. A linkage between the camera and sensor allows the sensor to be automatically orientated to an angle that is 180° from that of the camera's field of vision.

FIG. 3 shows an example of the orientation and relationship of the camera and upper light sensor. The sensor and camera must both be capable of rotating horizontally through 360° angle and tilt vertically through 180°. The linkage may be implemented by a mechanical coupling or digitally through an electronic controller. The linkage between the camera and the upper sensor ensures that the sensor measures the background illumination from the viewpoint of the individual under surveillance. The upper sensor also provides the angle of observation by an individual if they were looking directly at the aircraft. A second light sensor is attached under the aircraft to measure ground reflectance. This sensor is static and points downward towards the ground.

The upper and lower light sensors measure the amount of visual light incident on the aircraft's surfaces. The upper sensor measures the background light and the lower sensor the ground reflectance. These measurements are passed to a controller which calculates the amount of light that should be emitted by the light source.

The controller uses the method described previously with the measurements obtained from the two light sensors, the UAV's altitude, the distance to the individual on the ground, the actual reflectance and transparency values for the aircraft instead of the nominal values. The controller adjusts the amount of power to the light source in real-time according to the outcome of the calculations. This active illumination brightens or dims the light source to match the background sky as seen by the individual on the ground as the UAV flies across it.

The combination of the passive illumination through the design of the structure, configuration for an operation and the active illumination during an operation allows the aircraft to be optimally visually camouflaged for its expected operational environment. By utilising the limitations of human vision and making the camouflage directional, the amount of additional equipment for visual camouflage is reduced to two light sensors, a controller and the light sources. This represents a saving in weight over existing solutions in the prior art. Where components are chosen to be low power there is a minimal increase in the power consumption of the system which means that the UAV can extend the duration of an operation.

The UAV is designed to be very efficient by reducing its weight and power usage thereby enabling longer flight duration than would normally be possible for small size UAV. It can therefore be launched and recovered from a location that is remote from the target to be observed which reduces the probability that the surveillance operation will be detected by the target.

The invention includes a mode of operation of the UAV which is designed to further reduce the visual and auditory signatures of the aircraft to avoid detection.

Operationally, the UAV is launched away from the location of the individual to be observed, flown to the operating altitude and then flow to the target location. The UAV is flown at a constant low airspeed without undertaking any sudden movements that would increase the engine noise making it noticeable by changing the volume or pitch. Specular reflection from the airframe is also reduced by ensuring that a constant altitude is maintained with minimal changes of direction with respect to the sun, aircraft and individual under surveillance.

The camera is used to manually locate the individual under surveillance. The camera can then either be manually or automatically controlled to continuously track the individual. The linkage between the camera and the sensor ensures that all background illumination measurements are taken in the same alignment as that of the individual if they were looking directly at the aircraft. The lower light sensor continuously measures the ground reflectance incident on the underside of the UAV.

During an operation, the light sources are actively controlled in real-time with the method described above with the measurements made by the sensors and camera. The luminescence value calculated by the controller is used to adjust the active illumination by increasing or decreasing the output from the light sources.

The combination of a light-coloured underside of the UAV and the active variation of the level of light emitted makes the aircraft appear as bright as the background sky for the viewpoint of the individual on the ground. Active illumination ensures that as the UAV travels across the field of vison of the individual the contrast between the UAV and the background sky is minimised rendering the UAV indistinct to the human eye.

The UAV may also be flow in the lowest layer of the cloud base to further obscure its visual signature.

The novelty of the invention resides in utilising the optics properties of the terrain & atmospheric conditions, exploiting the limits of human visual acuity and restricting the viewpoint to that of the observer to reduce the equipment and complexity in implementing visual and audible camouflage for a light weight UAV. This informs the structural design, secondary configuration and operation of the UAV without adding excess weight or increasing the power requirements thereby extending the flight duration.

BRIEF DESCRIPTION OF THE DRAWINGS

The invention is described by reference to the accompanying drawings and two embodiments:

FIGS. 2a and 2b show the structural components of the UAV and the angular surface designed to reduce specular reflectance.

DETAILED DESCRIPTION

Figure 2A:
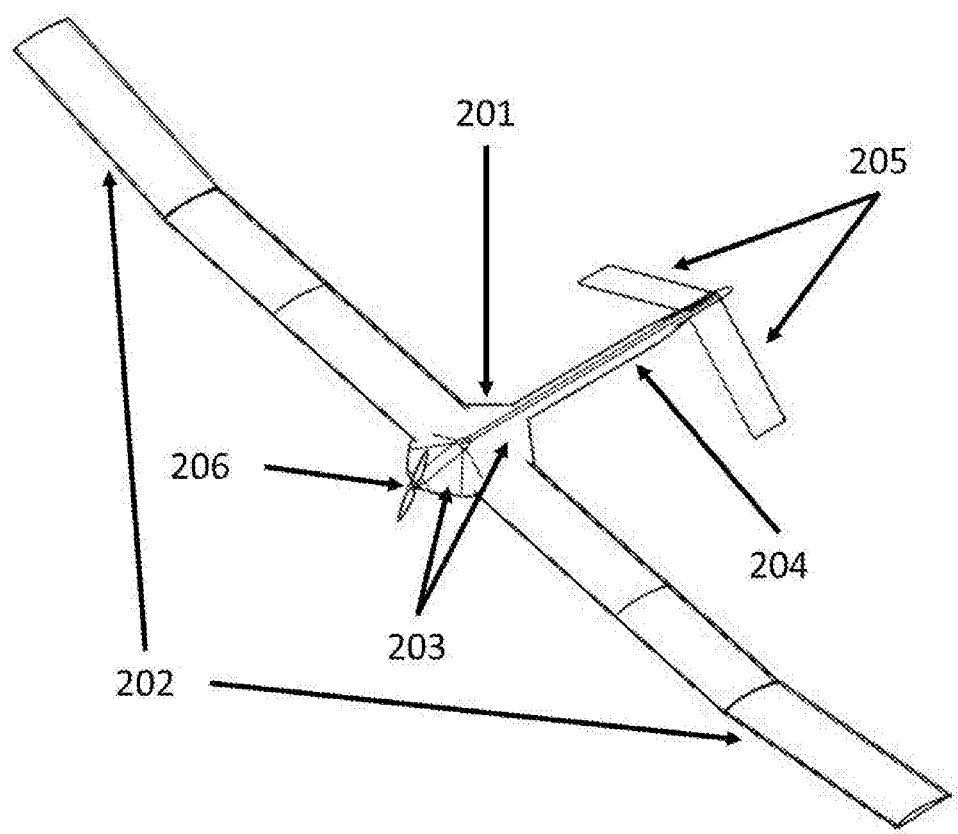

The first embodiment shown in FIGS. 2a and 2b is a UAV comprising of a body 201, removable wings 202, a tail boom 204 and twin tail fins 205. The body 201 is designed to have a flattened cross section comprising of several trapezoid surfaces 203. The cross section of the tail boom 204 is diamond shaped with two tail fin surfaces 205 angled downwards from the lower side. The surfaces' angles are designed to reduce specular reflection to a minimum when viewed side on at an angle of 45° at an altitude of 1000 m and a distance of 1000 m. In sunlight this ensures that glint from the edges is reduced.

A propeller and electric motor 206 are fitted to the body. These are chosen to be efficient and quiet in operation to reduce the auditory signature of the UAV. All upper surfaces of the fuselage are painted a matte grey and the propeller has a lighter matt grey coating.

Figure 3:
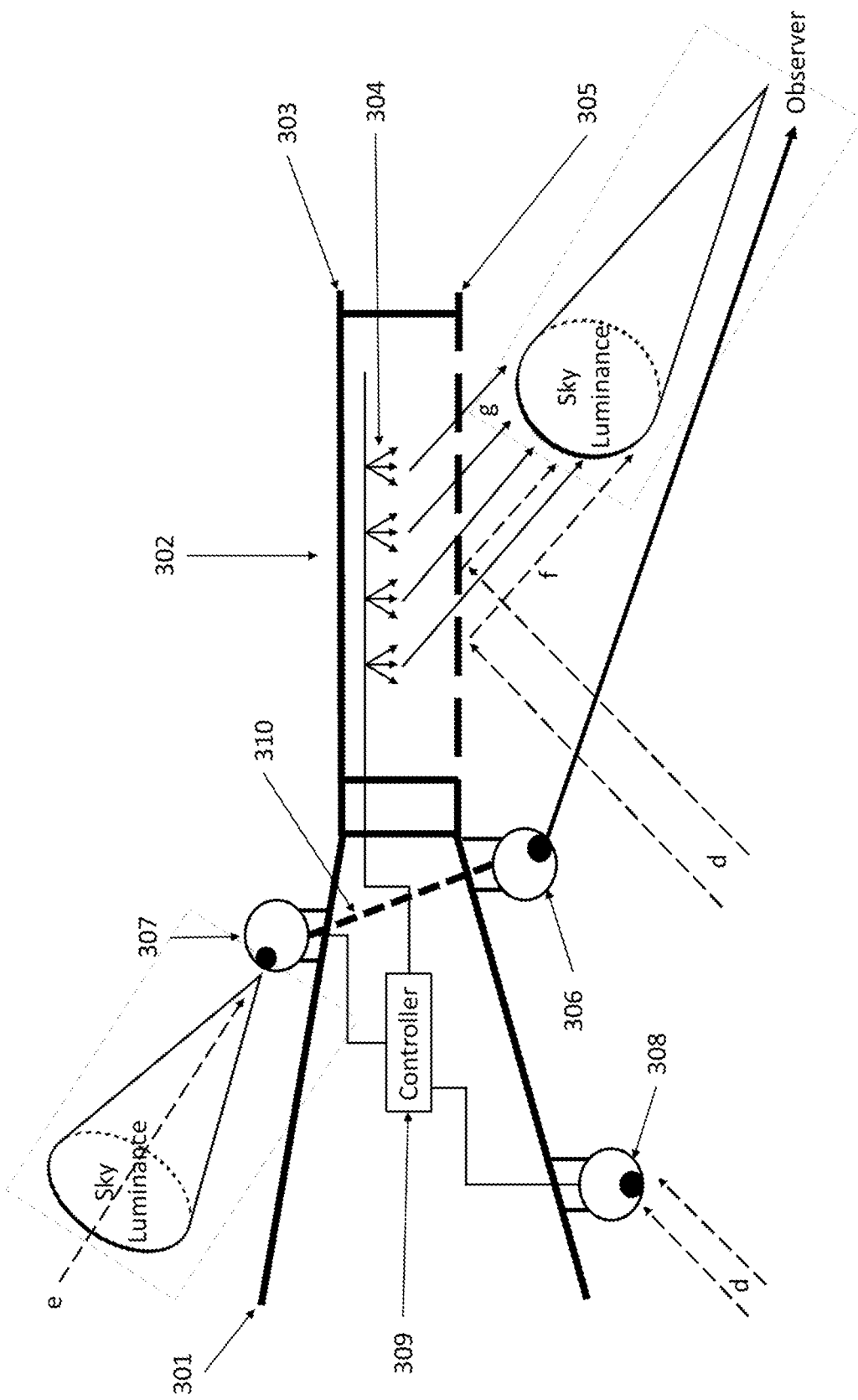
FIG. 3 shows a means of controlling the illumination emitted by the UAV to camouflage it from the viewpoint of an observer.

FIG. 3 shows a cross section of one of the removable wings 302 attached to either side of the body 301. The wings are constructed with an upper 303 and lower 305 surface between which are a number of LEDs 304. The body 301 also hosts the equipment that controls the active camouflage aspects of the invention during flight.

The position and orientation of the camera 306 and background illuminance sensor 307 are shown in FIG. 3. Both upper sensor and the camera are attached to gimbals that allow them to rotate and tilt. These are linked 310 together so that a movement in the camera gimbal results in an equal but opposite movement in the sensor gimbal. The ground reflection sensor 308 is also attached to the body 301 in a position that does not obscure the field of view of the camera 306. It is angled downward towards the ground. The background illuminance sensor 307 and ground reflection sensor 308 are connected to microcontroller 309 which adjusts the power input to the LEDs 304 using the illuminance values measured by the sensors 307 & 308. The microcontroller implements the method described in the invention for active illumination to reduce the visual signature of the UAV in flight.

Figure 1:
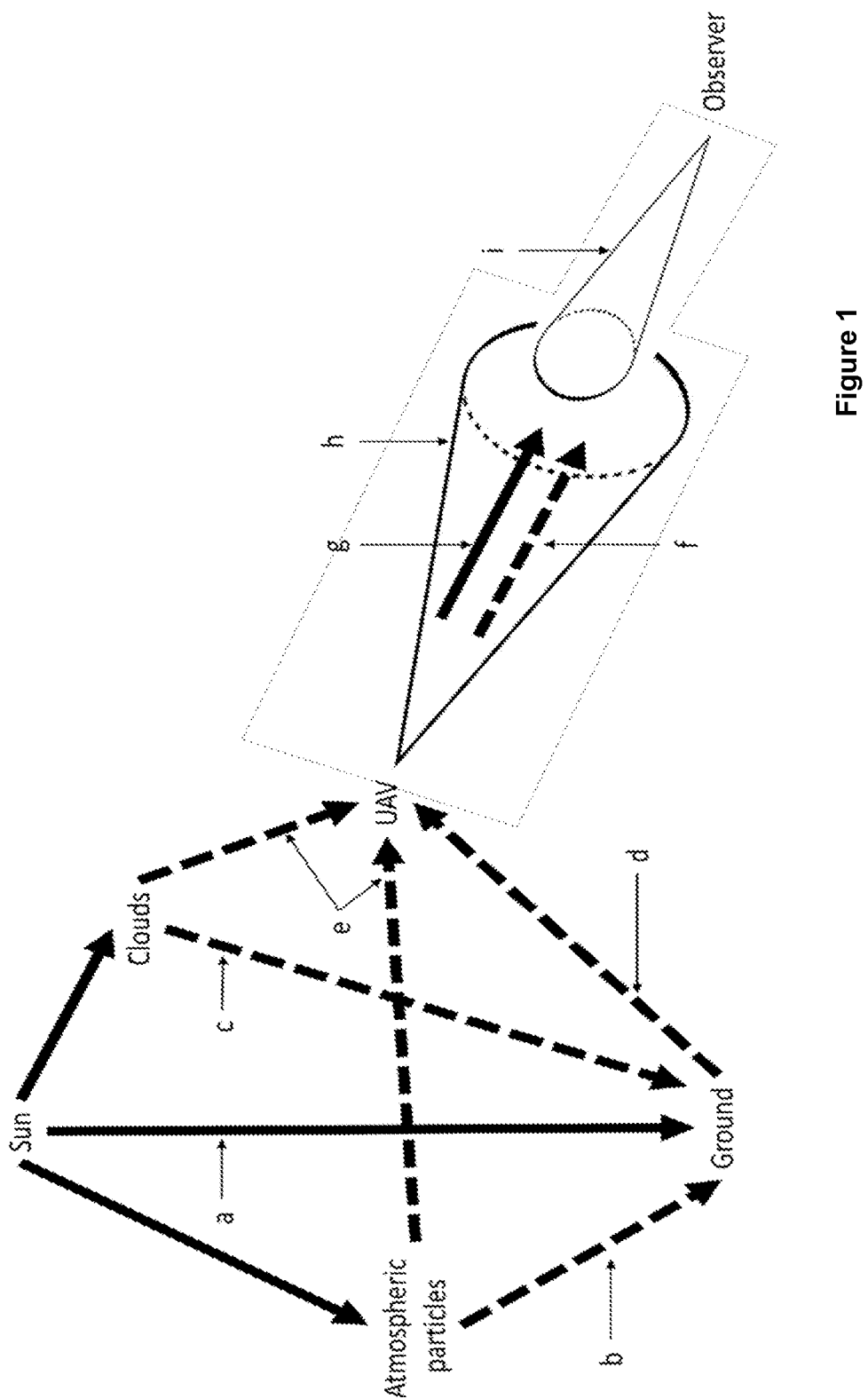
FIG. 1 shows the physical illumination and reflectance paths modelled within the invention.
Figure 4:
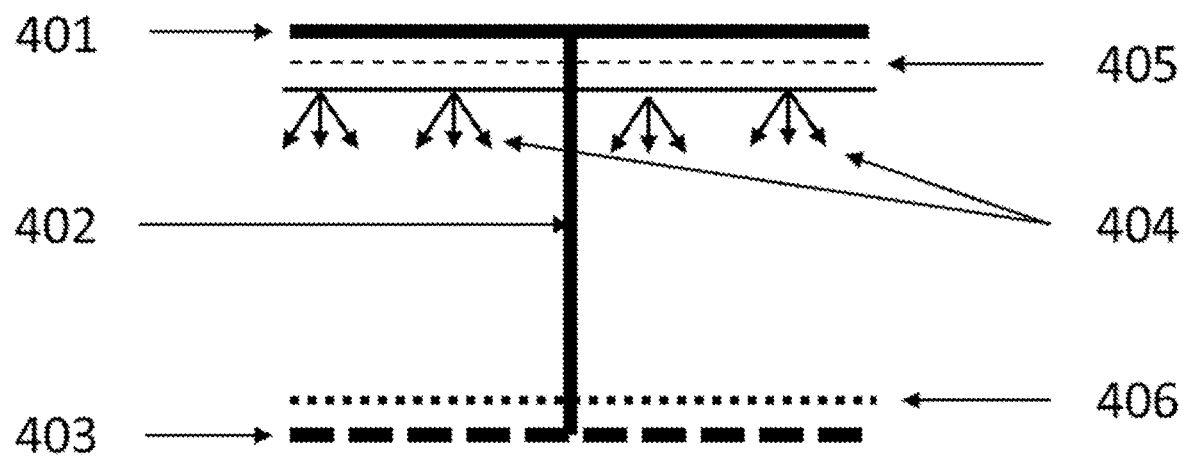
FIG. 4 show a cross section of a wing incorporating the illumination array where the upper wing surface is solid.

FIG. 3 references d, e, f, g show the path and direction of light illuminating and reflected by the UAV, previously described in relation to FIG. 1. FIG. 4 shows a cross section of the wing of the first embodiment comprising of an upper surface 401, a rib 402 and a lower surface 403. The UAV in this embodiment is intended to operate over highly reflective light-coloured terrain against a background of bright clouds. The upper surface 401 has a uniform matt grey covering and the lower surface 403 has a uniform translucent white surface. The inside of the upper surface is lined with a reflective layer 405 to which a strip of LED lights 404 are attached. The lower power, wide beam LEDs 404 are orientated downwards. The lower surface is made of two parts an outer translucent skin 403 and an inner mesh lining 406. The combination of the two parts diffuses the light from the LED so that they do not appear as point light sources but as a luminescent glow.

Figure 5:
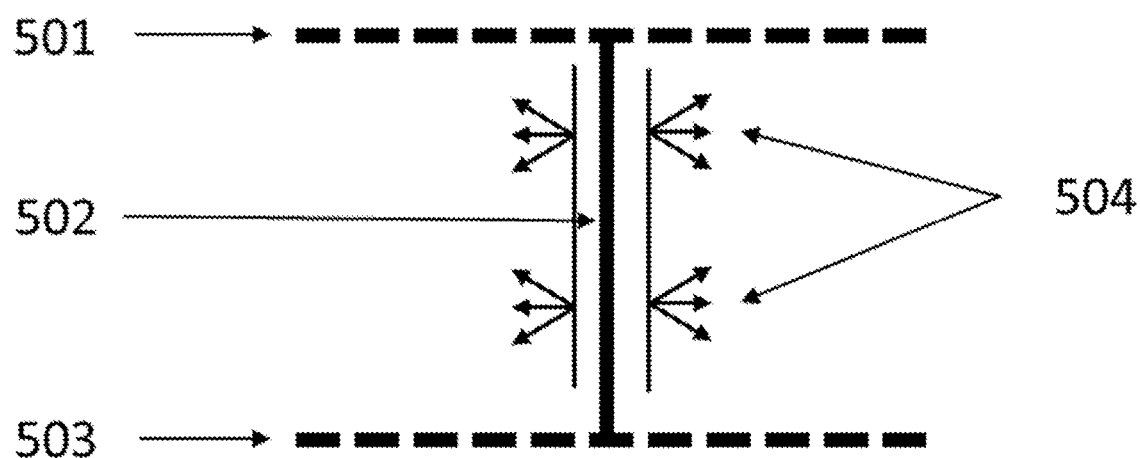
FIG. 5 show a cross section of a wing incorporating the illumination array where the upper wing surface is transparent.

The second wing embodiment, shown in FIG. 5, is an alternate configuration of wing structure intended for use in dark overcast conditions. Both the upper 501 and lower 503 surfaces are made of a transparent, non-reflective material. This allows most of the sky luminescence to be seen through the UAV wing. The ribs 502 and spars are the only solid components that require visually camouflaged. The wing material changes the amount of blocked light used in step 2 of the method to compute the active illumination required. In this embodiment fewer light sources 504 are needed and they are attached vertically to each rib to disguise the solid structures within the wing. In all other respects the UAV is the same as that in the first embodiment.

It would be readily appreciated that in further embodiments, the aircraft comprises wings that are not removable but perform the same function as the removable wings 302 described above.

What is claimed is:

1. An unmanned aerial vehicle (UAV) adapted to minimize visual and audible detection during flight that is comprised of:
    a flattened, angular shaped body;
    an angular shaped tail boom and tail;
    one or more motors;
    one or more propellers, wherein said one or more motors are for driving said one or more propellers;
    one or more wings; one or more light sensors capable of measuring the amount of visible light incident on UAV's surface;
    a camera; and
    a controller, wherein the one or more wings comprise an upper surface with an outside coating of diffuse dark colored material, an internal surface of the upper surface comprising a high reflective lining, one or more light sources attached horizontally to the reflective lining on the upper surface pointing downwards when the UAV is flying straight and level, a translucent or transparent lower surface and a diffuse translucent mesh attached to an internal surface of the lower surface.

2. The UAV according to claim 1, wherein the surface of the body is comprised of a number of angled trapezoid sections that are connected so that no surface is curved or at right angles to an adjacent surface.

3. The UAV according to claim 2, wherein the upper and lower surfaces of the body are oriented relative to one another to minimize specular reflection.

4. The UAV according to claim 2, wherein the surfaces of the body are oriented relative to one another to minimize specular reflection from a view point of an observer viewing the UAV at an angle of 45° to the side of the body from a range of 1000 m where the body is at an altitude of 1000 m.

5. The UAV according to claim 1, wherein the upper surface of the body, tail boom and tail reflect light diffusely.

6. The UAV according to claim 1, wherein the lower surface of the body, tail boom and tail reflect light.

7. The UAV according to claim 1, wherein the light sources are wide beam Light Emitting Diodes (LEDs).

8. The UAV according to claim 1, wherein a wing configuration is selected to match an initial assessment of the amount of light expected to be required for an operation, wherein obtaining the initial assessment comprises the steps of:
    ascertain the coloration of the terrain over which the operation is to take place, gain the angle of the sun at the latitude of the operation and the expected atmospheric conditions;
    calculate the amount of ground reflectance;
    divide the ground reflectance by the reflectance value for the underside of the UAV and pi;
    calculate the amount of light obscured by the UAV;
    the amount of light reflected by the UAV is deducted from the amount of light obscured by the UAV to give the net obscured light value;
    the net obscured light value is then adjusted to obtain the amount of light that would be seen from an individual's viewpoint of the UAV; and
    where a solid angle subtended by the UAV exceeds the solid angle resolvable by the human eye this value is multiplied by the result of the preceding step to give the amount of light needed to camouflage the UAV to be emitted in the direction of an individual.

9. The UAV according to claim 1, wherein the one or more light sensors are attached to the upper surface of the body and are capable of rotating horizontally by 360° and tilting vertically by 180°.

10. The UAV according to claim 9, wherein movement of the one or more light sensors are is-undertaken by a gimbal.

11. The UAV according to claim 1, wherein the one or more light sensors are attached to the lower surface of the body in a fixed position pointing downwards.

12. The UAV according to claim 1, wherein the camera is attached to the lower surface of the UAV body and is capable of rotating horizontally by 360° and tilting vertically by 180°.

13. The UAV according to claim 12, wherein movement of the camera is undertaken by a gimbal.

14. The UAV according to claim 12, wherein the camera is manually controlled to focus on and follow an object or person at ground level.

15. The UAV according to claim 1, wherein the camera and the one or more light sensors attached to the upper surface of the body are linked so as to maintain the orientation of the one or more light sensors so that the one or more light sensors points in the opposite direction by 180° to the center of the camera's field of view.

16. The UAV according to claim 15, wherein the camera and the one or more light sensors attached to the upper surface of the body are linked by a mechanical mechanism to maintain alignment.

17. The UAV according to claim 16, wherein the camera and the one or more light sensors attached to the upper surface of the body are linked by a digital electronic mechanism to maintain alignment.

18. The UAV according to claim 1, wherein the controller is connected to an upper light sensor, a lower light sensor and the light sources, wherein the controller receives measurements of the amount of light incident on a surface from the upper and lower light sensors, the angle of the upper light sensor calculates the amount of light to be emitted, and uses the amount of light to be emitted to control the power to the light sources.

19. The UAV according to claim 18 wherein the controller is configured to calculate the amount of power required to actively illuminate the UAV by:
- calculating the amount of light reflected by the UAV from the ground reflection measured by the lower light sensor;
- deducting the amount of reflected light from the amount of background light obscured by the UAV measured by the upper light sensor giving the net obscured light;
- multiplying the net obscured light by the surface area of the underside of the UAV, the angle of the upper light sensor which is the angle of view of the UAV by an individual and a solid angle of emitted light in the direction of the individual to give the emitted light;
- where the solid angle subtended by the UAV exceeds the solid angle resolvable by a human eye, multiply the emitted light value by the solid angle subtended by the UAV divided by the solid angle resolvable by the human eye; and
- converting the result of the calculation to a power value and set a power input to the light sources to this value.

* * * * *